Inventors
N. J. McLeod
William Way

Patented Nov. 7, 1944

2,362,038

UNITED STATES PATENT OFFICE 2,362,038

BALED HAY LOADING APPARATUS

William Way and Norman J. McLeod,
Boulder City, Nev.

Application September 2, 1943, Serial No. 500,964

3 Claims. (Cl. 214—83)

This invention relates to an apparatus for loading baled hay from the field onto a truck bed or the equivalent.

In addition, we aim to provide such an apparatus as may be manufactured as an attachment for a truck or the like and which is capable of being swung onto the truck bed when not being used.

More specifically, we aim to provide a rotatable drum having spikes or barbs at the periphery adapted to engage the bale of hay by travel over the latter, to elevate such bale and move it onto an apron, with fingers on the latter coacting to disengage the baled hay from the barbs, to enable such baled hay to slide on the apron onto the truck body or the like.

The more specific objects and advantages will become apparent from a consideration of the description following taken in connection with accompanying drawings illustrating an operative embodiment.

Figure 1:
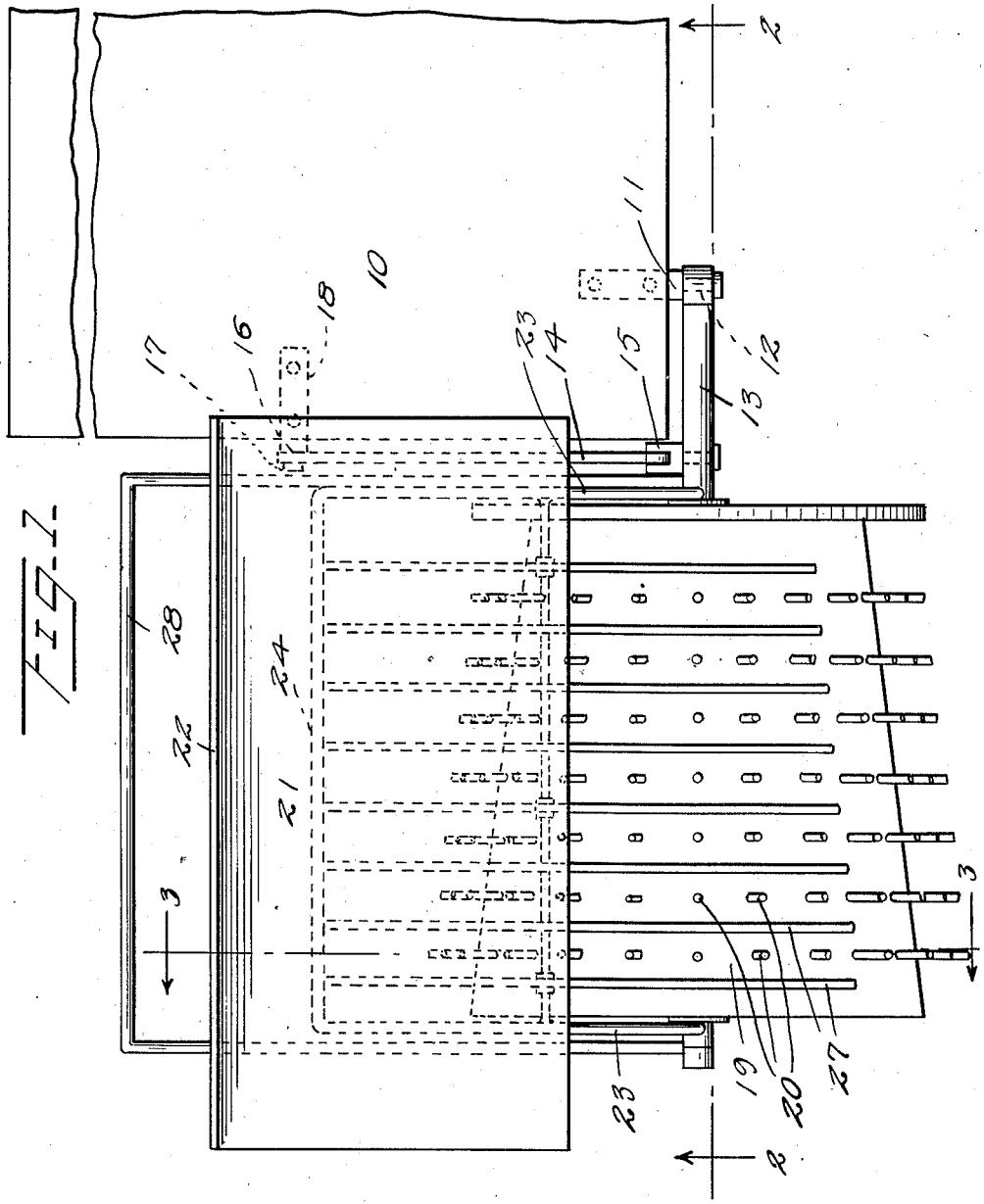
Figure 1 is a plan view of the apparatus shown in association with a fragment of a truck bed.

Referring to the drawings wherein like reference characters designate like or similar parts, the attachment is adapted to be carried by a mobile body, usually a truck, and a fragment of a truck bed has been shown by way of example at 10. At the rear of the truck bed a bracket 11 is attached having a stud at 12 on which a laterally extended beam 13 is pivotally mounted, so that parts carried thereby may be swung onto the truck body when not in use. However, normally beam 13 is extended as shown in the drawings and is so held by a pull rod 14 pivoted to the beam at 15. Such pull rod is disposed in the line of draft relatively close to the lefthand side of the truck body, and at the forward end is provided with a hook 16 or any other means whereby it may be detachably engaged with a stud 17 carried by a bracket 18 fastened on the truck bed.

Figure 2:
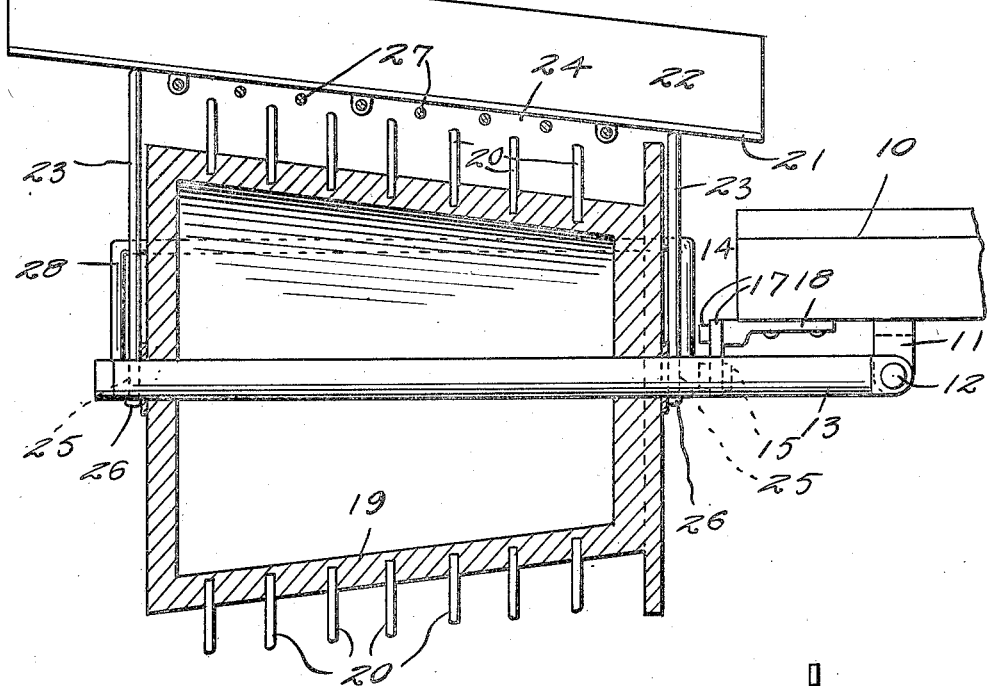
Figure 2 is a vertical sectional view taken on the plane of line 2—2 of Figure 1.
Figure 3:
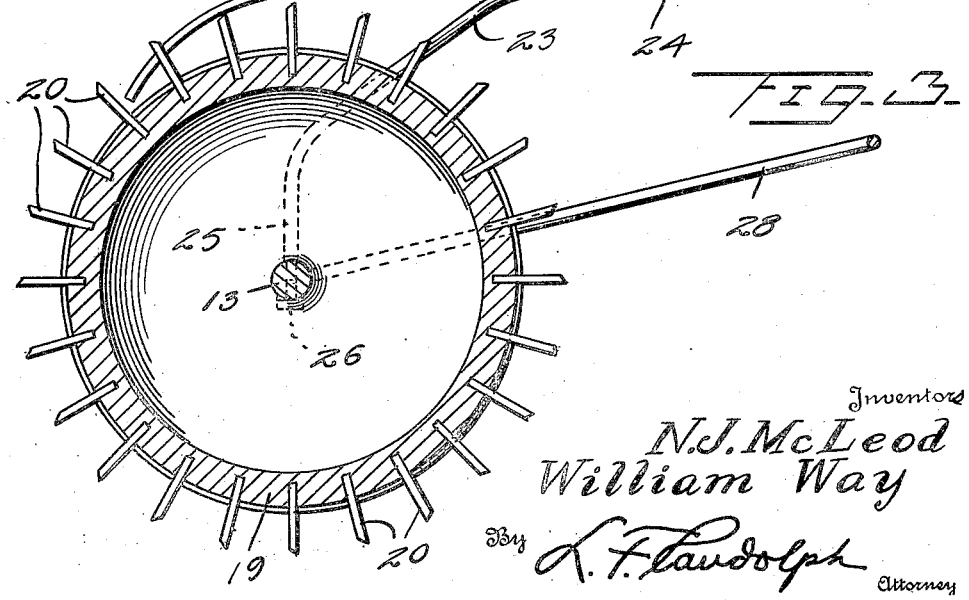
Figure 3 is a vertical sectional view taken at a right angle to Figure 2 and on the line 3—3 of Figure 1.

Rotatably mounted on the beam 13 laterally of the truck bed is a suitable gathering drum generally designated 19. Such drum 19 is preferably of wood and hollow. However, it may be made of any suitable material and preferably is tapered as shown with its larger diameter remote to the truck bed. Peripherally of the drum 19 we provide multitudinous spikes or barbs 20. Said drum 19 is mounted above the ground and at such elevation that it will be rotated by the engagement of the barbs 20 over baled hay in the field beneath the same, which action causes the barbs or spikes 20 to penetrate the bale and thereby elevate the same in the direction of the arrow indicated in Figure 3. The baled hay thus elevated is delivered onto an apron 21 having a vertical guard flange 22 at its forward edge and being downwardly inclined toward and partly over the truckbed 10 as shown in Figure 2, so that the baled hay will slide onto the truckbed to enable ready positioning thereon for transportation.

Said apron 21 is carried by the beam 13, being attached in any suitable way, for example to a generally arch-shaped frame 23, preferably at the bight portion 24 thereof, the frame having terminals 25 which at portions 26 extend through the beam 13 and are fastened thereto.

Suitably fastened to the under surface of the apron 21 are stripping fingers 27 which are employed in any suitable plurality. It will be noted that the stripping fingers 27 curve downwardly and rearwardly and terminate intermediate of and below the outer ends of spikes 20, to the end that as the bales of hay are lifted by the drum 19 they are transferred onto the lifting fingers 27 which strip the bales from the spikes 20 as the bales are moved onto the apron 21. There is more efficient coaction between the parts since the angularity of the apron corresponds to the angularity of the periphery of the drum 19.

Stripping fingers 27 preferably are welded to bight 24 of frame 23, and the apron 21 is mounted on certain of the fingers 27 in any suitable way.

We may provide a generally U- or arch-shaped guard rod at 28, to extend forwardly of the drum 19 and the spikes thereof, which rod 28 at its terminals is fastened in any suitable manner to the beam 13.

It will be realized that all parts of the apparatus or attachments are carried by the beam, and that when not in use the same may be disposed on the truckbed through the pivotal mounting as at 12, the parts thus avoiding undesirable lateral projection beyond the truckbed or the equivalent.

Every other row of the spikes 20 can be unbolted from inside the drum, and anything sacked in the field, for instance grain and the like, can be carried up on the drum and be loaded. The sacked grain or the like has to be lifted onto the drum about two feet, and will move upward.

Various changes may be resorted to provided that they fall within the spirit and scope of the invention.

We claim as our invention:

1. A device of the class described comprising a beam, means pivotally to mount said beam at the rear of a truck, pull rod means pivoted to said beam, means detachably to connect the pull rod means to the truck, a drum journaled on said beam having multitudinous peripheral spikes whereby it may engage and lift a bale, an apron to receive the bale, and means extending from the apron over the drum to dislodge the bale and move it onto the apron, as it is lifted by the drum, means to support said apron from said beam, means to pivotally mount the beam on a truck, and a guard supported by the beam extending forwardly of the said spikes.

2. A device of the class described comprising a beam, means pivotally to mount said beam at the rear of a truck, pull rod means pivoted to said beam, means detachably to connect the pull rod means to the truck, a drum journaled on said beam having multitudinous peripheral spikes whereby it may engage and lift a bale, an apron to receive the bale, and means extending from the apron over the drum to dislodge the bale and move it onto the apron as it is lifted by the drum, means to pivotally mount the beam on a truck, and means to support the beam against pivotal movement downwardly below the horizontal.

3. A device of the class described comprising a beam, means pivotally to mount said beam at the rear of a truck, pull rod means pivoted to said beam, means detachably to connect the pull rod means to the truck, a drum journaled on said beam having multitudinous peripheral spikes whereby it may engage and lift a bale, an apron to receive the bale, and means extending from the apron over the drum to dislodge the bale and move it onto the apron as it is lifted by the drum, means to support said apron from said beam, and a guard supported by the beam extending forwardly of said spikes, said drum being exteriorly tapered, said apron being disposed at approximately the angle of said taper, means pivotally to mount the beam on a truck, and means to augment the pivotal connection of the beam to a truck.

WILLIAM WAY.
NORMAN J. McLEOD.